United States Patent

[11] 3,580,232

| [72] | Inventor | Jorma O. Sarto<br>Orchard Lake, Mich. |
|---|---|---|
| [21] | Appl. No. | 47,488 |
| [22] | Filed | June 18, 1970<br>Division of Ser. No. 807,706, Mar. 17, 1969. |
| [45] | Patented | May 25, 1971 |
| [73] | Assignee | Chrysler Corporation<br>Highland Park, Mich. |

[54] ENGINE EXHAUST RECIRCULATION
7 Claims, 4 Drawing Figs.

[52] U.S. Cl. ................................................ 123/119,
60/30
[51] Int. Cl. ........................................ F02n 25/06
[50] Field of Search .......................................... 123/119
(A), 119; 60/30

[56] References Cited
UNITED STATES PATENTS

| 2,154,417 | 4/1939 | Anderson .................... | 123/119A |
| 2,354,179 | 7/1944 | Blanc .......................... | 123/119A |
| 3,209,531 | 10/1965 | Morris et al. ................ | 60/30 |
| 3,285,002 | 11/1966 | Hines .......................... | 60/30 |
| 3,397,682 | 8/1968 | Riggan ........................ | 123/119A |
| 3,402,550 | 9/1968 | Behrens....................... | 60/30 |
| 3,444,846 | 5/1969 | Sarto et al.................... | 123/119A |
| 3,449,086 | 6/1969 | Innes ........................... | 60/30 |
| 3,465,736 | 9/1969 | Daigh et al................... | 123/119A |
| 3,491,736 | 1/1970 | Walker......................... | 123/119A |

*Primary Examiner*—Wendell E. Burns
*Attorney*—Talburtt and Baldwin

ABSTRACT: Controlled recycling of automobile exhaust gases through a bypass conduit connecting the exhaust system and the fuel and air inlet system is accomplished during various engine-operating conditions by means of a venturi in the exhaust system at its connection with the bypass conduit, and also by means of a pitot-type opening of the bypass conduit into the inlet system, the dimensions and arrangement of the venturi and pitot opening being determined to effect a reverse flow of either fresh air or a fuel-air mixture into the exhaust system (depending on the location of the pitot opening upstream of downstream of the fuel supply into the inlet system) thereby to enhance complete combustion of the exhaust gases within an exhaust reactor in the exhaust system.

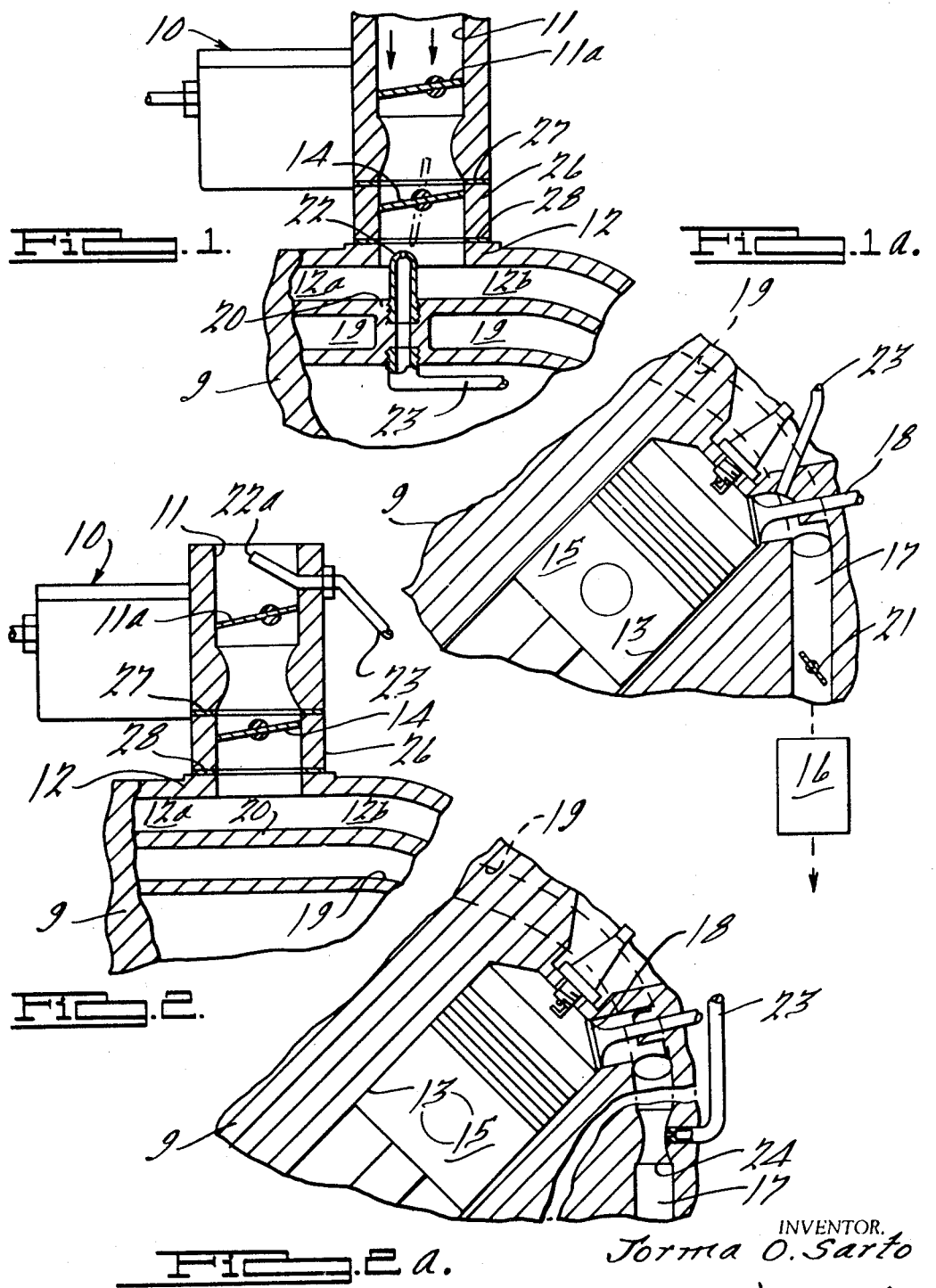

ENGINE EXHAUST RECIRCULATION

This application is a division of my copending application Ser. No. 807,706, filed Mar. 17, 1969, and is directed to the concept of reversing the flow through the bypass recirculating duct to supply clean air or a fuel-air mixture (as the case might be) to the exhaust system to enhance reaction in an exhaust reactor.

BACKGROUND AND SUMMARY OF THE INVENTION

In the prior art, numerous systems have been devised to recycle exhaust gas into the fuel-air induction system of an automobile engine for the purposes of preheating and vaporizing the incoming air-fuel mixture to facilitate its complete combustion in the combustion zone, for reusing the unignited or partially burned portions of the fuel which would otherwise pass out the exhaust pipe and into the atmosphere, and for reducing the oxides of nitrogen emitted from the exhaust system into the atmosphere. It has been found that approximately 15 percent exhaust gas recycling is required at moderate speeds to substantially reduce the nitrogen oxide content of the exhaust gases discharged in the atmosphere, that is, to below about 1,000 parts per million.

Although the prior-art structures have had the desired effect of reducing the content of nitrogen oxides in the exhaust by reducing the maximum combustion temperature in consequence of diluting the fuel-air mixture with recycled exhaust gases during certain operating conditions of the engine, these structures have not been commercially acceptable from the standpoints of both cost and operating efficiency and have been complicated by the desirability of reducing the recycling during conditions of both engine idling when nitrogen oxide emission is a minor problem and wide open throttle when maximum power is required, while progressively increasing the recycling of exhaust gases with increasing engine speed during cruising condition or with increasing engine load at part open throttle. The nitrogen oxide emission is a direct function of combustion temperature and for that reason is less critical during engine idling when the rate of fuel combustion and the consequent combustion temperature are minimal, and during wide open throttle conditions which are ordinarily of short duration.

In the usual gasoline or hydrocarbon fuel type engine, fuel combustion can take place at about 1,200° F. The formation of nitrogen oxides does not become particularly objectionable until the combustion temperature exceeds about 2,220° F., but the usual engine combustion temperature which increases with engine load or the rate of acceleration at any given speed frequently rises to about 2,500° F. It is known that the recycling of at least one-twentieth and not more than one-fourth of the total exhaust gases through the engine, depending on the load or power demand, will reduce the combustion temperature to less than 2,200° F. The desired result is usually obtained with the ordinary engine upon the recycling of about 15 percent of the total exhaust gases during partially open throttle as aforesaid.

An important object of this invention is to provide improved means uncomplicated by moving parts comprising a restricted recycling or bypass duct for recirculating a portion of the combustion products from the exhaust system to the inlet system of an automobile engine to overcome or avoid the problems and deficiencies of the prior art, as well as to achieve a number of important results including preheating and improved mixing and carburetion of the fuel-air mixture in the inlet header, the reduction of ice formation on the customary throttle blade, and the reduction of nitrogen oxides in the exhaust.

Another object is to provide such a construction wherein the bypass duct extends in heat exchange relationship through the customary throttle body of the inlet system and terminates within the induction conduit in a nozzle directed to discharge hot exhaust gases upstream against the flow of the fuel-air mixture in the induction conduit and also against the usual throttle valve, thereby to provide simple, economical and effective means for accomplishing the foregoing as well as for preheating the throttle body and simultaneously cooling the exhaust gases in the bypass conduit below the fuel ignition temperature, and for diluting the fuel-air mixture with substantially incombustible exhaust gases to lower the combustion temperature in the engine and thereby reduce the formation of nitrogen oxides during the combustion process.

Another object is to provide such a construction wherein communication through a fixed bypass restriction exists at all times between the exhaust and inlet systems and, within the range from idle to light or moderate load conditions, the total fluid flow through the fixed restriction increases at any given engine speed with increasing engine load.

For example in a conventional automobile engine, the pressure downstream of the throttle varies roughly in the neighborhood of from one-half atmosphere during idling to approximately 1 atmosphere at wide open throttle, while the exhaust pressure simultaneously varies roughly from 1 to 2 atmospheres. These factors compensate for the increasing combustion temperature with increasing load and result in a desirable increase in the effectiveness of the exhaust recycling through the fixed bypass restriction with increasing load or acceleration.

As the engine load or acceleration decreases and the speed stabilizes at a cruising condition, the combustion temperature and the pressure differential across the fixed bypass restriction, as well as the total quantity of exhaust gases, decrease and the rate of exhaust recycling declines for improved fuel economy, again as desired because less recycling is required to maintain the combustion temperature below the level at which nitrogen oxide formation is objectionable.

Another and more specific object is to provide an exhaust-recycling system comprising a bypass duct which terminates within the induction conduit at a pitot-type opening to discharge the exhaust gases in opposition to the inlet gases, whereby the recycling of exhaust gases is rendered nominal when the throttle valve is in its wide open position.

In one embodiment of the invention the pitot opening of the bypass duct is located downstream of the typical butterfly-type throttle valve so as to be partially shielded from the inlet gas flow during part throttle operation. The bypass duct, including its fixed restriction and the angle of the pitot opening with respect to the inlet flow, is arranged and dimensioned so that more than 5 percent but less than approximately 25 percent and usually about 15 percent of the total exhaust gases are conducted through the bypass duct when the throttle is partially open and the effective pressure differential between its ends corresponds to cruising or part open throttle acceleration conditions, but when the pitot opening is exposed to the full velocity of the inlet flow, i.e., when the throttle valve is wide open, the direction of the bypass flow is reversed to conduct a portion of the inlet gases directly into the exhaust system for subsequent combustion in an exhaust reactor. Thus in the situation where the combustible components in the exhaust gases are too lean for complete combustion in the reactor, the fuel supplied via the reverse flow through the bypass duct from the inlet system will enable complete combustion in the reactor.

Many automotive engines provide for an excessive fuel enrichment at wide open throttle which results in incomplete combustion and tends to reduce overheating in the combustion chamber that would otherwise result. In some instances, the resulting unburned fuel components in the exhaust are more than adequate to support combustion in a hot exhaust reactor if adequate oxygen is present.

It is accordingly another object to provide a bypass duct arrangement as aforesaid, except that the pitot opening is located upstream of the point where fuel is induced into the inlet system, whereby during the aforesaid reverse bypass flow at wide open throttle fresh air only will be conducted into the exhaust system to facilitate complete combustion of the unburned components of the exhaust gas in the reactor.

Another more specific object is to provide an exhaust-recycling system wherein the upstream end of the bypass duct is located within a venturi portion of the exhaust system, as for example adjacent the exhaust valve seat where the rate of exhaust flow is a maximum, thereby to provide means for decreasing the effective pressure differential between the ends of the bypass conduit and to effect the aforesaid reversal of the bypass flow during engine operation under high load.

Another object is to employ a venturi effect at the end of the bypass duct opening into the exhaust system in combination with the pitot effect at the opposite end of the bypass duct opening into the inlet system to achieve a versatile and more accurate control over the bypass flow from the exhaust system into the inlet system during light-load operation than has been possible heretofore without recourse to moving parts, and to achieve a reversal in the direction of the bypass flow at or near wide open throttle operation to supply the exhaust system with a portion of the inlet fuel-air mixture, or fuel free air if the opening of the bypass duct within the induction conduit is upstream of fuel nozzle, to facilitate the complete combustion in an exhaust reactor or afterburner.

Other objects of this invention will appear in the following description and appended claims, reference being had to the accompanying drawings forming a part of this specification wherein like reference characters designate corresponding parts in the several views.

BRIEF DESCRIPTION OF THE DRAWINGS

FIGS. 1 and 2 are schematic fragmentary cross-sectional views through two different automobile engine induction systems showing two embodiments of the downstream ends of the exhaust bypass duct.

FIGS. 1a and 2a are similar views showing two modifications of the upstream ends of the bypass duct.

It is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

DESCRIPTION OF THE PREFERRED EMBODIMENTS

Referring to FIG. 1, an application of the present invention is illustrated by way of example with an automobile engine 9 having a carburetor 10 providing the inlet fuel-air induction conduit 11, which comprises the upstream portion of an inlet header 12 for supplying a combustible fuel and air mixture to the engine cylinders 13. The carburetor 10 may comprise any conventional type which has the usual air inlet at the upstream end of the induction conduit 11, the usual fuel-metering system and nozzles or jets for supplying idle and operating fuel to the conduit 11 during various operating conditions and for enriching the fuel supply during acceleration and wide open throttle, and the usual automatic choke (including choke valve 11a) and thermostatic means for controlling idle enrichment and fast idle operation during cold starting conditions. An example of such a carburetor is illustrated by way of example in Ball U.S. Pat. No. 2,966,344, so that the foregoing conventional features disclosed in the latter patent are incorporated herein by reference and are not described in detail.

The downstream portion of the induction conduit 11 comprises the customary throttle body 26 containing the conventional butterfly-type throttle valve 14. The inlet fuel-air mixture is conducted via the headers or manifolds 12a and 12b, comprising extensions of the header 12, to the left and right banks of cylinders 13 respectively in time relation with operation of the engine pistons 15. After combustion of the fuel-air mixture above the pistons 15, the exhaust gases are conducted in timed relationship with respect to the reciprocation of the pistons 15 and exhaust valves 18 to the exhaust manifolds or headers 17, which may discharge through an afterburner or exhaust reactor 16 and thence through a muffler to the atmosphere. The exhaust reactor or afterburner 16 operates to complete the combustion of incompletely burned fuel before discharging the exhaust to the atmosphere, and may be supplied with additional fuel and air to facilitate combustion therein in accordance with known practice.

The left and right manifolds 17 are connected by a crossover exhaust header or conduit 19 which conducts the hot exhaust gases into heat exchange relationship with portions 20 of the wall of the inlet header. The wall portions 20 extend transversely to the direction of flow of the inlet mixture and are commonly referred to as the "hot spot" which preheats the inlet mixture and enhances vaporization and mixing of liquid fuel droplets. A thermostatically controlled valve 21 in one header 17 controls the flow of hot gases in the crossover conduit 19 so as to expedite heating of the hot spot 20 during the engine warmup period and to prevent overheating during operation of the engine under load. The structure described thus far may be conventional.

Associated with the throttle valve 14 and extending through the hot spot 20 is a restricted nozzle 22 connected by means of a bypass or recycling conduit 23 with the exhaust header 17 at the location of a venturi restriction 24, FIG. 2a, or proximate the annular seat for valve 18 which connects the upper end of cylinder 13 with header 17. A venturi effect at the restricted opening defined by the annular seat for valve 18 results in a reduced pressure at the location of the opening of conduit 23 into header 17, so that during periods of high engine load, as for example near wide open throttle conditions, the effective static pressure at said opening causing bypass flow of exhaust gases through nozzle 22 will be reduced with respect to the total exhaust pressure in header 17. At the same time, the increased inlet pressure within conduit 11 at the region of nozzle 22, Fig. 1, or nozzle 22a, Fig. 2, and the corresponding increased rate of inlet flow of fuel and/or air opposing the exhaust jet from nozzle 22 or 22a at or near wide open throttle conditions effectively reduces the recycling of exhaust gases into the induction conduit.

The reduced exhaust recycling at high engine load conditions is accomplished by reason of the reduced effective pressure differential urging bypass flow through the bypass nozzle 22 or 22a, caused in turn by the reduced pressure at the upstream venturi end and the increased rate of inlet flow dynamically opposing the upwardly directed exhaust jet from nozzle 22 or 22a. These factors may be predetermined to achieve a reverse flow through nozzle 22 or 22a at or near wide open throttle conditions, whereby a highly combustible mixture of fuel and air is added to the exhaust header 17 by aspirator action to facilitate complete combustion of the exhaust products in the reactor 16. At part throttle opening, the upper open end of nozzle 22 is shielded at least in part by throttle valve 14 from the dynamic or velocity pressure of the inlet gases. At wide open throttle, dotted position, the upper end of nozzle 22 is exposed to the inlet velocity flow in the manner of a pitot tube, thereby to oppose and reduce the exhaust recirculation when maximum power is required.

For operation during normal cruising conditions, the nozzle 22 has a fixed restriction dimensioned to enable controlled recycling of a portion of the exhaust gas into the inlet fuel-air mixture to pass at least 5 percent and not more than 25 percent of the total exhaust gases, depending upon the specific engine and its operating conditions. In the usual situation effective reduction of nitrogen oxides in the exhaust is accomplished by recycling approximately 15 percent of the exhaust gases as aforesaid, preferably through several nozzles 22 arranged in the manner of the nozzle shown where a multiple-barrel carburetor is involved.

In climatic regions where icing is a problem, each nozzle 22 may be extended into proximity with its associated throttle valve 14 by means of an integral low-resistance tubular stand pipe having a length depending upon the specific geometry and location of the portion of the hot spot 20 through which it extends. Each bypass conduit 22,23 will thus have the same resistance to gas flow. The flow of the hot exhaust gases through the hot spot 20 and nozzle 22 also facilitates preheating of the hot spot 20 and throttle valve 14 to assure vaporization of the inlet mixture and the prevention of ice formation adjacent the edges of the throttle valve 14. Simultaneously the recycled exhaust gases are cooled below the ignition temperature of the combustible inlet mixture. To this end the nozzle 22 is preferably of heat-conducting material and is sufficiently long to achieve the necessary heat transfer from the exhaust gases to the hot spot and inlet mixture. Also by directing the exhaust gases directly in opposition to the flow of the inlet mixture, improved breaking up, dispersion and vaporization of liquid fuel droplets are achieved with consequent improved mixing of the combustible inlet gases and uniform predictable combustion characteristics within the cylinders 13.

A modification of the exhaust-recycling system is illustrated in FIG. 2 wherein the exhaust jet is directed angularly into induction conduit 11 through nozzle 22a located upstream of the choke valve 11a, which is also upstream of the conventional fuel nozzles discharging into conduit 11. By predetermining the angle of the nozzle 22a and its restriction, a balance between static and dynamic pressures can be obtained for controlling the recycling of the exhaust gases under various engine-operating conditions. The lower end of duct 23 in FIG. 2 communicates with exhaust header 17 as illustrated in FIG. 1a or at the location of the venturi restriction 24 for operation substantially as described. In FIG. 2a, the venturi restriction 24 is located sufficiently remote from valve 18 so as to minimize pressure pulsing that occurs at the region of valve 18 in consequence of its opening and closing. Where the pressure pulsing is not objectionable, the lower end of conduit 23 in FIG. 2 may be located as described with reference to FIG. 1a.

In FIG. 2, direct heating of throttle valve 14 is not as effective as in FIG. 1, but the FIG. 2 construction is preferred where it is desirable to add clean air without fuel to header 17 during wide open throttle conditions by causing reverse flow in bypass duct 23 from nozzle 22a to header 17, so as to increase the efficiency of the exhaust reactor 16 in combusting exhaust products before these are discharged to the atmosphere.

In other respects, the structure of FIG. 2 operates to accomplish substantially the same exhaust recycling as in FIG. 1. In both structures, the exhaust recycling during normal idle is a minimum, when the formation of noxious nitrogen oxides during combustion is also a minimum. During partly open throttle conditions, the effective pressure differential between the exhaust pressure in header 17 and the inlet pressure in conduit 11 and the resulting rate of exhaust recycling will increase as the throttle opening increases, so as to effect the desired amount of exhaust recycling until at or near wide open throttle, the venturi effect at the lower end of conduit 23 substantially reduces the exhaust recycling. Also in both structures, a reverse flow of fuel and air (FIG. 1) or clean air (FIG. 2) from conduit 11 to header 17 and reactor 16 may be effected if desired at wide open throttle conditions, depending on the arrangement and relative dimensions of the parts involved, especially the restrictions for nozzles 22 and 22a and the angles of their respective jets into the inlet conduit 11, and the effectiveness of the venturis described.

FIG. 2a illustrates the bypass restriction at the lower end of duct 23 opening flush into header 17. Thus nongaseous combustion products cannot readily enter and accumulate within the bypass nozzle and clog the bypass system. Where the exhaust contains appreciable quantities of materials that tend to form gummy residues upon cooling, as for example in giving up heat to the hot spot 20, FIG. 1, these residues have less tendency to deposit within the hot passage 19 or header 17 than in the cooler nozzle 22 or 22a. Where desired the restriction in the bypass conduit 23 illustrated in FIG. 1a can be made at the juncture with the header 17.

I claim:
1. In an internal combustion engine,

A. an inlet header for conducting a fuel-air mixture to said engine for combustion therein,
B. a throttle valve for controlling the flow of said mixture to said engine,
C. an exhaust header for discharging exhaust gases from said engine,
D. means for effectively inhibiting the formation of oxides of nitrogen during said combustion at part open throttle conditions by limiting the combustion temperature comprising restricted bypass duct means for conducting exhaust gases from said exhaust header into said inlet header,
E. exhaust reactor means in communication with said exhaust header downstream of the communication of the latter with said bypass duct means to receive exhaust gases for effecting the reaction of incompletely reacted components of said exhaust gases, and
F. means for reversing the flow through said bypass duct during wide open throttle operation comprising opposite ends of said bypass duct means opening respectively into said exhaust and inlet header at predetermined locations and angular arrangements with respect to the gas flow within their respective headers to effect a higher effective pressure during said wide open throttle operation at the one end of said bypass duct means opening into said inlet header than at the opposite end of said bypass duct means opening into said exhaust header, thereby to reverse the flow through said bypass duct means and supply inlet gases to said exhaust header to facilitate said reaction in said reactor.

2. In the combination according to claim 1, said means for reversing the flow through said bypass duct means during wide open throttle operation comprising a venturi restriction in said exhaust header, said opposite end of said bypass duct means opening into said exhaust header at said restriction in communication with the decreasing static pressure thereat with increasing exhaust flow therethrough.

3. In the combination according to claim 1, said throttle valve comprising a throttle blade pivotal within said inlet header, said one end of said bypass duct means opening into said inlet header comprising a pitot-type opening located downstream of said throttle valve and exposed to the velocity pressure of the inlet flow when said throttle valve and exposed to the velocity pressure of the inlet flow when said throttle valve is at its wide open position, the blade of said throttle valve shielding said pitot-type opening from said velocity pressure when said blade is partially open.

4. In the combination according to claim 3, a venturi restriction in said exhaust header, said opposite end of said bypass duct means opening into said exhaust header in communication with the decreasing static pressure at said restriction with increasing exhaust flow therethrough to cooperate with said pitot-type opening to effect the flow of inlet gases through said bypass duct means into said exhaust header during wide open throttle operation.

5. In the combination according to claim 1, means for supplying fuel to said inlet header, said means for reversing the flow through said bypass duct means during wide open throttle operation comprising a pitot-type opening for said one end of said bypass duct means located upstream of said means for supplying fuel and exposed to the velocity pressure of the inlet flow of fresh air in said inlet header.

6. In the combination according to claim 5, said opposite end of said bypass duct means opening into said exhaust header at a predetermined angle to effect an aspirator action thereat during said wide open throttle operation.

7. In the combination according to claim 6, said exhaust header having a venturi restriction to effect decreasing static pressure at said restriction with increasing exhaust flow therethrough, and said opposite end of said bypass duct means opening into said exhaust header at the region of said restriction.